United States Patent [19]
Chang et al.

[11] Patent Number: 6,025,877
[45] Date of Patent: Feb. 15, 2000

[54] SCALABLE TRANSMISSION METHOD OF VISUAL OBJECTS SEGMENTED BY CONTENT-BASE

[75] Inventors: Hee-Dong Chang; Young-Kwon Lim, both of Daejeon, Rep. of Korea

[73] Assignee: Electronics and Telecommunications Research Institute, Daejeon, Rep. of Korea

[21] Appl. No.: 08/959,084

[22] Filed: Oct. 28, 1997

[30]    Foreign Application Priority Data

Oct. 28, 1996  [KR]   Rep. of Korea ...................... 96-49300

[51] Int. Cl.[7] .............................. H04N 7/12; H04N 7/04; G06K 9/36
[52] U.S. Cl. ......................... 348/395; 348/384; 348/390; 348/397; 348/845; 345/327; 345/328; 395/200.61; 395/200.62; 395/200.66; 395/200.63
[58] Field of Search ..................................... 345/327, 328; 348/469, 395, 384, 390, 845, 845.2, 397, 398; 382/232, 243, 236; 395/200.66, 200.67, 200.62, 200.61, 200.63

[56]    References Cited

U.S. PATENT DOCUMENTS

| | | | |
|---|---|---|---|
| 5,475,430 | 12/1995 | Hamada et al. | 348/395 |
| 5,552,829 | 9/1996 | Kim et al. | 384/392 |
| 5,623,312 | 4/1997 | Yan et al. | 348/416 |
| 5,629,736 | 5/1997 | Haskell et al. | 348/387 |
| 5,687,095 | 11/1997 | Haskell et al. | 348/387 |
| 5,754,766 | 5/1998 | Shaw et al. | 395/200.3 |
| 5,786,855 | 7/1998 | Chen et al. | 348/391 |
| 5,805,221 | 9/1998 | Lee | 348/397 |

OTHER PUBLICATIONS

Thierry Turletti et al., "Videoconferencing on the Internet", IEEE/ACM Transactions on Networking, vol. 4, No. 3, Jun. 1996, pp. 340–351.

Hee Dong Chang et al., "A scalable Video Transmission Method over The Internet", Electronics and Telecommunications Research Institute.

Soumen Chakrabarti et al., "Adaptive Control for Packet Video", Proceedings of the International Conference on Multimedia Computing and Systems, May 1994, 1994 IEEE, pp. 56–62.

*Primary Examiner*—John K. Peng
*Assistant Examiner*—Paulos M. Natnael
*Attorney, Agent, or Firm*—Jacobson, Price, Holman & Stern PLLC

[57]    ABSTRACT

The present invention relates to a method of scalable transmission of video objects segmented by content-base, comprising the steps of: constituting a set of video objects to be transferred (TxSet); checking as to whether TxSet is the last portion of a video sequence, and then calculating a current transmission rate and a transmission tolerance data size; constituting a video object evaluation group (egs); comparing the data size of the video object evaluation group with a data size of TxSet elements plus a data amount of the video objects of the transmission priority j and then adding the video objection evaluation group (egs) to the TxSet; and checking as to whether the video object of the transmission priority j is the last element of the video object evaluation group i.

7 Claims, 5 Drawing Sheets

FIG. 4

| EVALUATION GROUP OF VIDEO OBJECTS | GROUP i+1 | | | | GROUP i | | | |
|---|---|---|---|---|---|---|---|---|
| VIDEO OBJECT A SEQUENCE (GOP STRUCTURE : IPBP) | ⑦ (2,P) | ⑧ (2,B) | ⑥ (2,P) | ⑤ (2,I) | ③ (1,P) | ④ (1,B) | ② (1,P) | ① (1,I) |
| VIDEO OBJECT B SEQUENCE (GOP STRUCTURE : IPBP) | ⑪ (3,P) | ⑫ (3,B) | ⑩ (3,P) | ⑨ (3,I) | ⑪ (3,P) | ⑫ (3,B) | ⑩ (3,P) | ⑨ (3,I) |
| VIDEO OBJECT C SEQUENCE (GOP STRUCTURE : IBBP) | ② (1,P) | ④ (1,B) | ③ (1,B) | ① (1,I) | ⑥ (2,P) | ⑧ (2,B) | ⑦ (2,B) | ⑤ (2,I) |
| VIDEO OBJECT D SEQUENCE (GOP STRUCTURE : IP) | ⑯ (3,P) | ⑭ (3,I) | ⑮ (3,P) | ⑬ (3,I) | ⑯ (3,P) | ⑭ (3,I) | ⑮ (3,P) | ⑬ (3,I) |
| VIDEO FRAME SEQUENCE | FRAME t+7 | FRAME t+6 | FRAME t+5 | FRAME t+4 | FRAME t+3 | FRAME t+2 | FRAME t+1 | FRAME t |

SCALABLE TRANSMISSION METHOD OF VISUAL OBJECTS SEGMENTED BY CONTENT-BASE

BACKGROUND OF THE INVENTION

1. Field of the Invention

The present invention relates to a scalable transmission method of visual objects segmented by content-base in order to provide excellent video services, which are highly demanded in the Internet of which the transmission speed is variable.

2. Description of the Related Art

In general, a content-based video encoding scheme is shown that a content of the input picture (for example, person, desk, flower and the like) is segmented into video objects, and then segmented video objects are coded. The principle of the coding and decoding is described in FIG. 1.

FIG. 1 illustrates an earlier schematic diagram of a video transmission system, wherein the reference numeral 11 represents the content-based object segmenting part, 12 represents the encoding part, 13 represents the multiplexing part, 14 denotes the transmitting part, 15 denotes the receiving part, 16 denotes the demultiplexing part, 17 denotes the decoding part, and 18 represents the picture reconstructing and displaying part, respectively.

As shown in FIG. 1, the content-based object segmenting part 11 segments an inputted video frame sequence for example, content-object sequence A, content-object sequence B, and background object sequence C. Then, the encoding part 12 encodes the above segmented video object sequences, respectively. Meanwhile, those encoded video object sequences are multiplexed by the multiplexing part 13, resulting in one bitstream. Then, the bitstream is transmitted by the transmitting part 14 via a network.

Once the transmitted bitstream arrives at the receiving part 15, the bitstream is demultiplexes into several encoded video object sequences by the demultiplexing part 16. Then, with the help of the decoding part 17, the encoded video object sequences are decoded to the original video object sequence. Finally, the picture reconstructing and displaying part 18 reconstructs the decoded video sequence for display by using the spatial and temporal information.

In the meantime, the encoding scheme for the video objects adopts the predictive encoding scheme which involves an Intra type (I type) encoding, a Predictive type (P type) encoding, and a bidirectionally predictive type (B type) encoding. In the I type encoding, the prediction is achieved within the object. In the P type encoding, the prediction having a forward characteristic with regard to time is achieved. As to the B type encoding, the prediction having a bidirectional characteristic with regard to time is accomplished.

Meanwhile, the I type encoding uses information only on the current frame for encoding. The P type encoding uses either the previous I or P type video object for encoding. Also, the B type uses both the previous I or P type object and the next I or P type object.

In addition, it is assumed that the encoding of the video objects recurs with a specific pattern, for example, IPBBP . . . IPBBP . . . IPBBP. The set of video objects having this specific pattern is called Group Of Pictures (hereinafter, referred to as GOP).

However, there has been a problem that the motion picture services, such as Video On Demand (hereinafter, referred to as VOD), can not guarantee a high quality on the Internet whose channel transmission speed is varying every point of time.

SUMMARY OF THE INVENTION

Therefore, it is the objective of the present invention to provide a method of scalable transmission of content-based segmented video objects by transferring video objects according to their transmission priority, after scaling down the data size of the frame for the purpose of receiving the transmitted video bitstream at the source frame rate. Thus, a high quality of the video can be obtained because the effect of the varying transmission speed is apparently minimized.

In accordance with one embodiment of the present invention, a scalable transmission method of video objects segmented by content base comprises the following steps of:

constituting a set of the video objects to be transferred (hereinafter, referred to as TxSet), and then transferring the TxSet;

checking as to whether or not the TxSet is the last portion of the moving video sequence, and then calculating the current transmission rate (hereinafter, referred to as TxRate) and the transmission tolerance data size;

constituting a video object evaluation group, and setting the TxSet;

comparing the data size of the video object evaluation group (egs) with the number of the TxSet elements (hereinafter, referred to as TxSetSize) plus the data amount of the video objects of the transmission priority j (hereinafter, referred to as ObjSize (j)), and then changing the number of the TxSet elements; and checking as to whether or not the video object of the transmission priority j (hereinafter, referred to as Object (j)) is the last element of the video object evaluation group i.

BRIEF DESCRIPTION OF THE DRAWINGS

The novel features believed characteristic of the present invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 illustrates an arrangement of the video objects for determining the transmission priority in accordance with the present invention.

DETAILED DESCRIPTION OF THE PREFERRED EMBODIMENT

The preferred embodiment of the present invention will be described in detail referring to the attached drawings.

Figure 2:
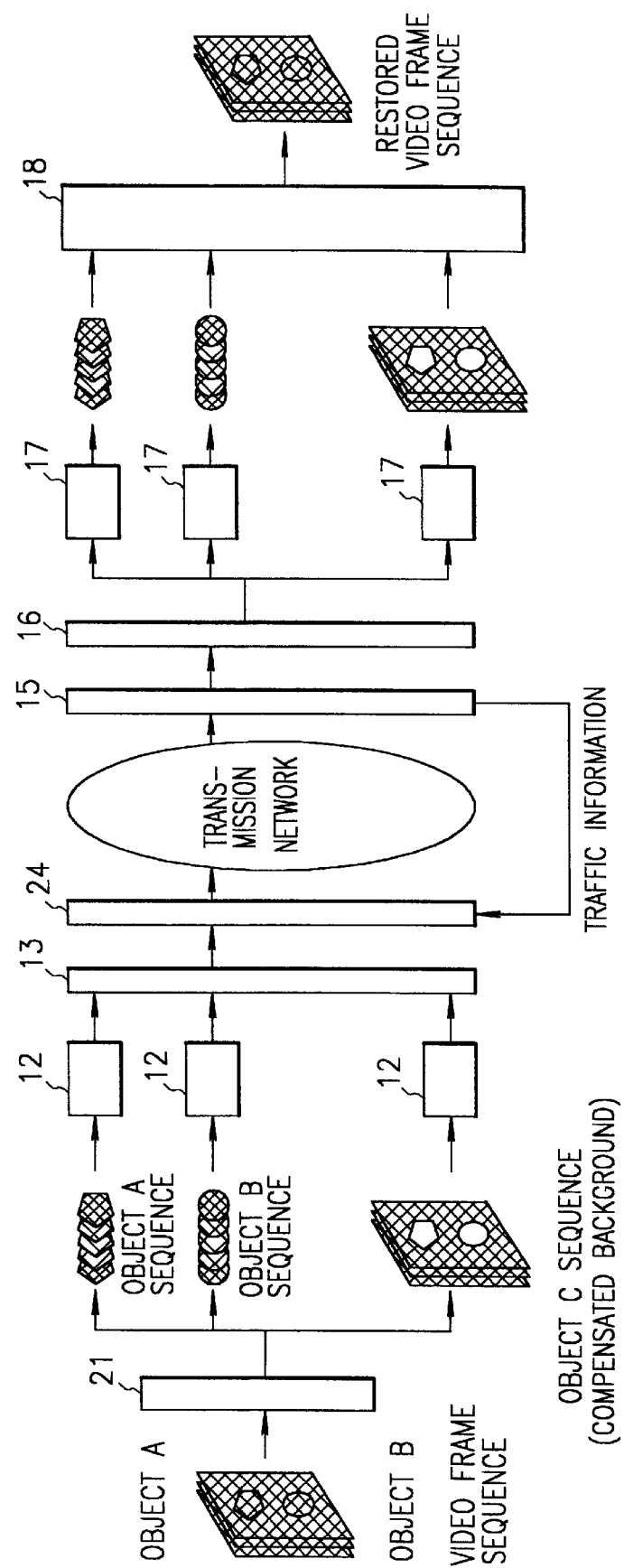
FIG. 2 illustrates a schematic diagram of a scalable video transmission system in accordance with the present invention.

FIG. 2 illustrates a schematic diagram of a scalable video transmission system in accordance with the present invention. Also, FIG. 3 illustrates a background compensation method in accordance with the present invention.

Figure 1:
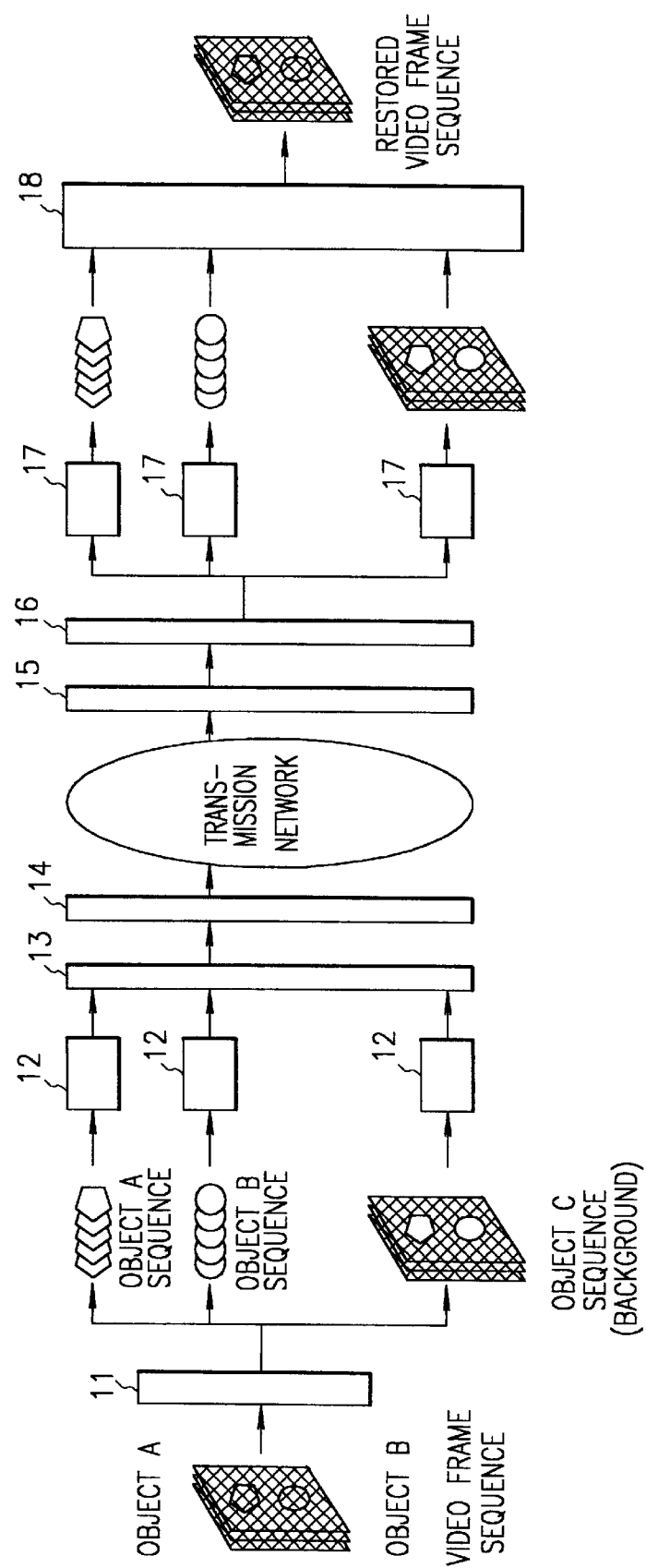
FIG. 1 illustrates an earlier schematic diagram of a video transmission system.
Figure 3:
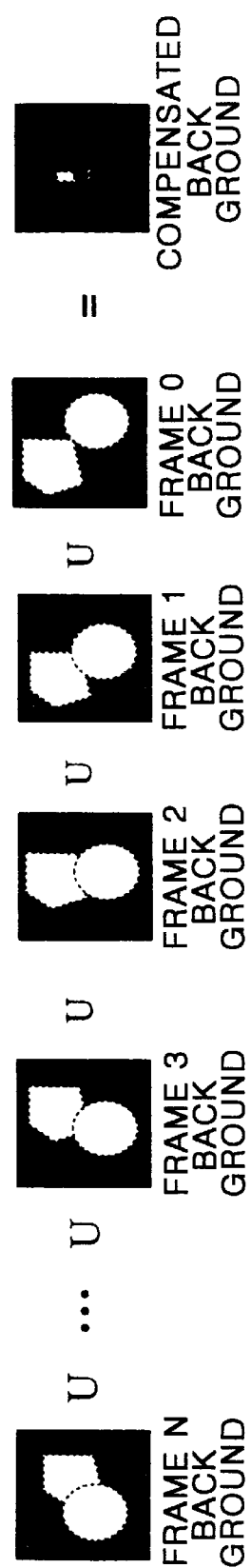
FIG. 3 illustrates a background compensation method in accordance with the present invention.

Referring to FIG. 2, the scalable video transmission system segments the input video frames with the content-based method like FIG. 1, and then determines the transmission priority ranking for each video object, and also compensates the background objects as shown in FIG. 3.

Meanwhile, the video object sequence is encoded and multiplexed as shown in FIG. 1, and then the multiplexed video object bitstream follows the scalable transmission method by the scalable transmitting part 24. The next procedures are the same as that of the prior art as shown in FIG. 1.

That is, the scalable video transmission system is composed of the subsequence initiating part 21 for segmenting, and then initiating the video frame sequence into the subsequence having the same background (that is, the subsequence initiating part 21 is used for segmenting the content-based video objects, determining the transmission priority ranking, and compensating the background objects), the encoding part 12 for encoding the segmented object sequence by the video object, the multiplexing part 13 for multiplexing the encoded video object bitstream, the scalable transmitting part 24 for transmitting the multiplexed video object bitstream scalably, the receiving part 15 for receiving the transmitted bitstream, the demultiplexing part 16 for demultiplexing the received bitstream, the decoding part 17 for decoding the encoded video object sequence by the video object, and the scene reconstructing and displaying part 18 for reconstructing the decoded video sequence for display by using the spatial and temporal information.

Compared with the prior art, it can be easily seen that the core elements of the present invention are the subsequence initiating part 21 and the scalable transmitting part 24. Their feature and function are now described in detail.

In order to display the video data at the source frame rate, the proposed system should receive the video bitstream at the source frame rate. This can be realized by determining the size of the maximum data on the frame which can be received at the source frame rate under the current transmission speed of the network, and then selecting and transmitting the video objects according to the transmission priority.

Therefore, even though the size of the transmission data is varying scalably according to the change of the transmission speed, the transfer frame rate is the same as the input video frame rate. Also, because the video objects are transmitted according to the transmission priority, the important information of the scenes is fully received. Thus, the receiving end can obtain an excellent video which is nearly free from the effect resulting from the varying transmission speed.

More specifically, the video frame sequence is segmented into the subsequence having the same background, the video objects on the video frame are segmented by the content base (for example, person A, person B, desk, and chair). At this time, the objects having the same content have the same identification (ID) number. For instance, in case a video object A is allocated to a desk at a frame t, a desk at a frame t+s is also a video object A.

In the meantime, the transmission priority ranking of the segmented video objects has 3 rankings, i.e., ranking 1, ranking 2, and ranking 3. Of course, the number of the ranking can be increased or decreased according to the kind of the application. Hence, the video objects corresponding to a high ranking are transmitted earlier than the video objects with a low ranking.

The transmission priority ranking can be determined either automatically or manually, considering the content, importance, and motion characteristic of the video objects. That is, the transmission priority ranking can be determined automatically in the order of the moving degree.

Referring to the compensation of the background for each subsequence, the background is partially occluded by the foreground video objects. When the video objects are separated from the background, the information occupied by the video objects is lost. Therefore, in case all the background objects in the subsequence are finished with the calculation of summing their elements, the background whose information is least lost can be obtained as shown in FIG. 3. Even in case of restoring the display through the scene-composing video objects at an arbitrarily selected time, this compensated background does not make the vacant portion between the background and the video objects.

FIG. 4 illustrates an arrangement of the video objects for determining the transmission priority in accordance with the present invention.

The sets of the video objects (hereinafter, referred to as a video object evaluation group) which are included in the frames of the Least Common Multiple (LCM) of the Group Of Pictures (hereinafter, referred to as GOP) length (that is, the number of the elements) are shown in FIG. 4, wherein since the GOP length of the video objects A, B, and C is 4, respectively, and the GOP length of the video object D is 2, the number of the frames corresponding to the video object evaluation group is 4.

In addition, as to the method of determining the transmission priority of each video object, the transmission priority is determined by the following manners:

first, in the transmission priority ranking order; and
second, in case of having the same transmission priority ranking, in the encoding type order, i.e., I type, P type, and finally B type.

For example, as shown in FIG. 4, in case of determining the transmission priority regarding the objects whose object video sequence is B, and video object evaluation group is j, their transmission priority begins with 9 since the objects have the transmission priority ranking 3, and then the last priority is finished with 12 according to the encoding type, i.e., in the order of I type, P type and B type.

Figure 5:
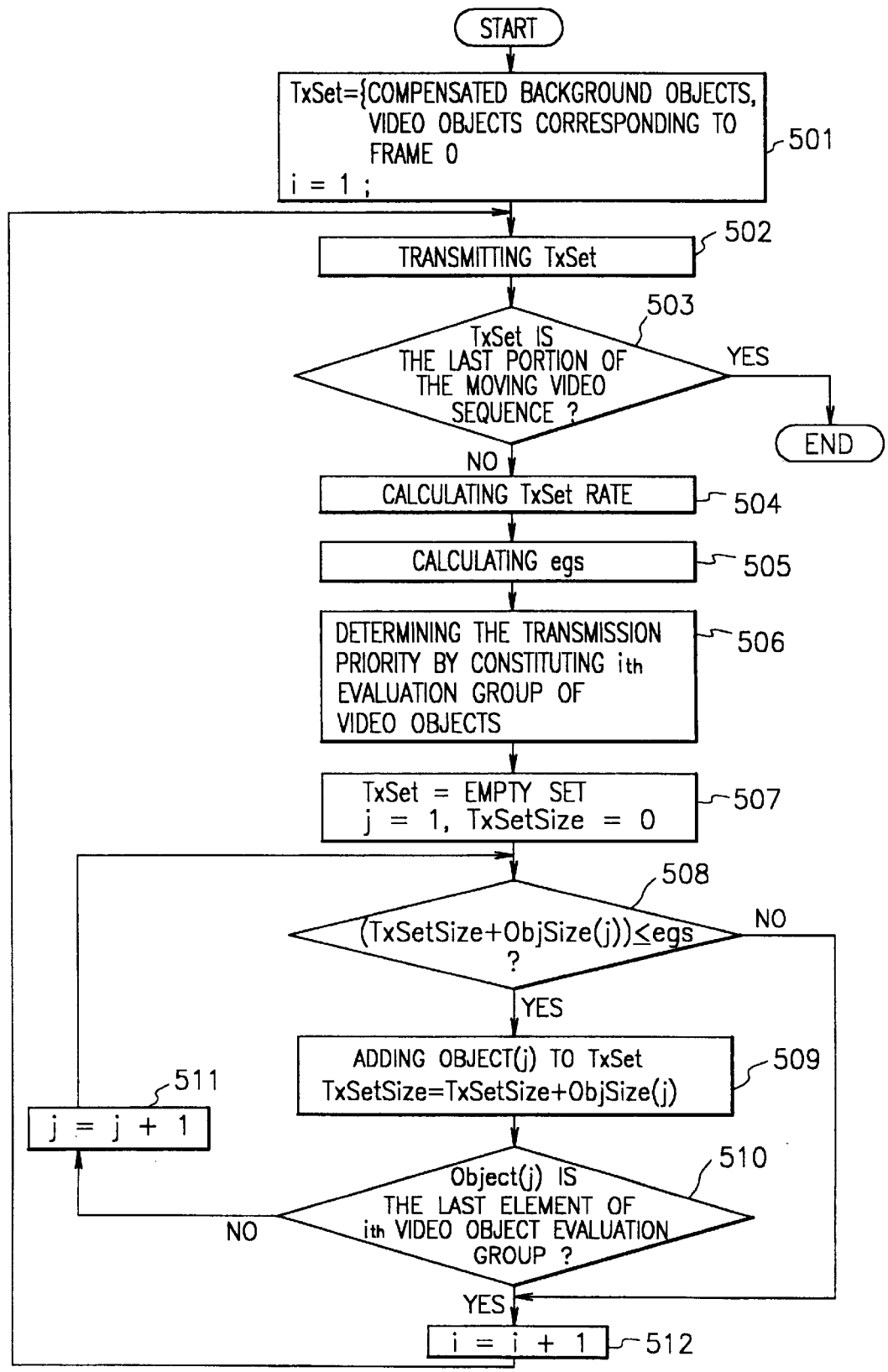
FIG. 5 illustrates a flow chart of the scalable transmission of the video objects in accordance with the present invention.

FIG. 5 illustrates a flow chart of the scalable transmission of the video objects in accordance with the present invention, wherein TxSet represents the set of the video objects to be transmitted, TxSetSize represents the data size of TxSet, TxRate represents the current transmission rate, Object (j) represents the video object whose transmission priority is j, and ObjSize represents the amount of data of Object (j), respectively.

The TxSet is composed of the compensated background objects, and the video objects whose frame is 0, and then the video object evaluation group i is set at 1 (step 501). Then, the TxSet is transmitted (step 502). The TxSet is verified as to whether or not the TxSet is the last portion of the moving video sequence (step 503). In case the TxSet is the last portion, the operation is finished, on the other hand, in case the TxSet is not the last portion, the TxRate is calculated from the TxSet transmission (step 504).

In addition, the transmission data size of the video object evaluation group (egs), which can be received at the source frame rate under the current transmission speed, is calculated by the following equation (step 505):

$$egs = TxRate \div FRate \times n$$

wherein, egs is the transmission data size of the video object evaluation group, TxRate represents the current transmission rate, and FRate represents the source frame rate, and n represents the number of the frame corresponding to the video object evaluation group, respectively.

Then, after constituting the video object evaluation group i, the transmission priority of the elements is determined (step 506). Also, the TxSet is preset with a set having no element, and the transmission priority j is allocated as 1, and the TxSetSize is preset with 0, respectively (step 507).

Then, whether the TxSetSize plus Object (j) is smaller than or equal to the transmission data size of the video object evaluation group (egs) is checked (step 508).

In case the TxSetSize plus Object (j) is larger than the transmission data size of the video object evaluation group (egs), the process returns to step 502 after i is changed to i+1 (step 512). On the other hand, in case the TxSetSize plus Object (j) is smaller than or equal to the transmission data size of the video object evaluation group (egs), the object whose transmission priority j, Object (j) is added to the TxSet, and the ObjSize (j) is added to the TxSetSize (step 509).

In addition, the Object (j) is checked as to whether or not the Object (j) is the last element of the transmission data size of the video object evaluation group i (step 510). In case the Object (j) is not the last element, the process returns to step 508 after j is changed to j+1 (step 511). On the contrary, in case the Object (j) is the last element, the process returns to step 502 after i is changed to i+1 (step 512).

As described above, especially being used in the Internet having a great variation of the transmission speed, the present invention gives an excellent video service such as VOD because of receiving the video bitstream at the source frame rate.

Furthermore, since the video objects are transmitted according to the transmission priority, the receiving end can obtain a good quality of the video with the least effect resulting from the variation of the transmission speed.

While the invention has been particularly shown and described with reference to a preferred embodiment, it will be understood by those skilled in the art that various changes in form and detail may be made therein without departing from the spirit and scope of the invention.

What is claimed is:

1. A scalable transmission method of video objects segmented by content-base, comprising the following steps of:

constituting a set of video objects to be transferred (hereinafter, referred to as TxSet), and then transmitting said TxSet:

checking as to whether said TxSet is the last portion of a video sequence, and then calculating a current transmission rate (hereinafter, referred to as TxRate) and a transmission tolerance data size;

constituting a video object evaluation group (egs), and setting said TxSet;

comparing the data size of the video object evaluation group (egs) with a data size (hereinafter referred to as TxSetSize) of said TxSet elements plus a data amount (hereinafter, referred to as ObjSize (j)) of the video objects of the transmission priority j, and then adding the video object evaluation group (egs) to the TxSet; and checking as to whether the video object (hereinafter referred to as Object (j) of the transmission priority j is the last element of the video object evaluation group i.

2. The method as in claim 1, wherein said step of constituting said TxSet, and then transmitting said TxSet includes the following steps of:

constituting said TxSet with a compensated background objects and the video objects whose frame is 0, and then setting the video object evaluation group i at 1; and transmitting said TxSet.

3. The method as in claim 1, wherein said step of checking as to whether or not said TxSet is the last portion of the video sequence, and then calculating said TxRate and the transmission tolerance data size includes the following steps of:

checking as to whether or not said TxSet is the last portion of the video sequence;

finishing the operation in case said TxSet is the last portion, on the other hand, calculating said TxRate from said TxSet transmission in case said TxSet is not the last portion; and calculating the transmission data size of the egs, which can be received at the source frame rate under the current transmission speed, by using the following equation:

$$egs = TxRate \div FRate \times n$$

wherein, FRate represents the source frame rate, and n represents the number of the frame corresponding to the video object evaluation group, respectively.

4. The method as in claim 1, wherein said step of constituting a video object evaluation group, and setting said TxSet includes the following steps of:

determining the transmission priority of the elements after constituting the video object evaluation group i; and presetting said TxSet with a set having no element, allocating the transmission priority j as 1, and presetting said TxSetSize with 0, respectively.

5. The method as in claim 1, wherein said step of comparing the data size of the video object evaluation group (egs) with said TxSetSize plus said ObjSize (j), and then changing the number of the TxSet includes of the following steps of:

checking whether the TxSetSize plus said Object (j) is smaller than or equal to the transmission data size of the video object evaluation group (egs);

returning to the step of transmitting said TxSet after changing i to i+1 in case said TxSetSize plus said Object (j) is larger than the transmission data size of the video object evaluation group (egs); and adding said Object (j) to said TxSet, and also adding said ObjSize (j) to said TxSetSize in case said TxSetSize plus said Object (j) is smaller than or equal to the transmission data size of the video object evaluation group (egs).

6. The method as in claim 1, wherein said step of checking as to whether or not said Object (j) is the last element of the video object evaluation group i includes the following steps of:

checking as to whether or not said Object (j) is the last element of the transmission data size of the video object evaluation group i;

returning to step of checking whether said TxSetSize plus said Object (j) is smaller than or equal to the transmission data size of the video object evaluation group (egs) after changing j to j+1 in case said Object (j) is not the last element; and returning to step of transmitting said TxSet after changing i to i+1 in case said Object (j) is the last element.

7. The method as in claim 4, wherein said transmission priority of the elements is determined by the transmission priority ranking, and then the encoding type, i.e., in the order of I type, P type and B type.

* * * * *